United States Patent
Klippstein et al.

(10) Patent No.: US 12,014,485 B1
(45) Date of Patent: Jun. 18, 2024

(54) METHOD AND ASSEMBLY FOR NON-DESTRUCTIVELY INSPECTING A SURFACE STRUCTURE

(71) Applicant: siOPTICA GmbH, Jena (DE)

(72) Inventors: Markus Klippstein, Jena (DE); André Heber, Weimar (DE); Eric Günl, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 18/558,299

(22) PCT Filed: May 4, 2022

(86) PCT No.: PCT/EP2022/061987
§ 371 (c)(1),
(2) Date: Oct. 31, 2023

(87) PCT Pub. No.: WO2022/233939
PCT Pub. Date: Nov. 10, 2022

(30) Foreign Application Priority Data

May 5, 2021 (DE) .................... 10 2021 111 707.0

(51) Int. Cl.
*G06T 7/00* (2017.01)
(52) U.S. Cl.
CPC .. *G06T 7/0004* (2013.01); *G06T 2207/10056* (2013.01); *G06T 2207/30164* (2013.01)
(58) Field of Classification Search
CPC ......... G06T 7/0004; G06T 2207/10056; G06T 2207/30164

USPC ............................................. 348/92; 356/430
See application file for complete search history.

(56) References Cited

U.S. PATENT DOCUMENTS

| | | | |
|---|---|---|---|
| 6,225,628 B1 | 5/2001 | Iwabuchi et al. | |
| 9,952,393 B2 | 4/2018 | Dobrinsky et al. | |
| 2009/0033637 A1 | 2/2009 | Han | |
| 2010/0321696 A1 | 12/2010 | Malik et al. | |
| 2015/0253256 A1 | 9/2015 | Zhou | |
| 2022/0252507 A1* | 8/2022 | Noda | G06T 7/0004 |

FOREIGN PATENT DOCUMENTS

| | | |
|---|---|---|
| DE | 197 54 647 A1 | 6/1998 |
| DE | 10 2010 037 786 A1 | 3/2012 |

* cited by examiner

*Primary Examiner* — Marnie A Matt
(74) *Attorney, Agent, or Firm* — Christensen, Fonder, Dardi & Herbert PLLC (57) ABSTRACT

A method for the nondestructive inspection of a surface structure, including: preparing the surface structure; wetting a portion of the surface structure with a liquid, the variation in the thickness of the liquid above the portion of the surface structure being at most 50% of the maximum thickness of the liquid above the surface structure, so that the liquid forms a light guide which has, and is bounded by, the inverse shape of the surface structure at a first large surface and is bounded by air at a second large surface; coupling light into the light guide so that the inverse shape of the surface structure at the first large surface is impinged by light such that light coupled into the light guide is coupled out of the light guide via the second large surface; capturing an image of the light coupled out and; evaluating the captured image.

13 Claims, 2 Drawing Sheets

Prior Art

METHOD AND ASSEMBLY FOR NON-DESTRUCTIVELY INSPECTING A SURFACE STRUCTURE

PRIORITY CLAIM

The present application is a National Phase entry of PCT Application No. PCT/EP2022/061987, filed May 4, 2022, which claims priority from German Patent Application No. 10 2021 111 707.0, filed May 5, 2021, the disclosures of which are hereby incorporated by reference herein in their entirety.

FIELD OF THE INVENTION

The invention is directed to the field of nondestructive inspection of surface structures, for example, of surface structures which are used as tool inserts for producing optical surfaces on a workpiece, particularly on a light guide.

BACKGROUND OF THE INVENTION

Various microscopic and far-field approaches utilizing electrons, photons or mechanical scanning are known for the nondestructive inspection of surface structures. Among these are, inter alia, methods such as scanning electron microscopy, confocal microscopy, scatter measurements or visual inspection based on determined spatially-limited and/or wavelength-limited illumination. DE 10 2010 037 786 A1 describes a laser scanning microscope in which reflected light is detected and evaluated. The disadvantage in this case consists in that the optical functioning of an optical surface structure to be inspected cannot be replicated, so that even surface structures having sufficiently high quality may be erroneously rejected.

Further, DE 197 54 647 A1 discloses a scanning electron microscope. While an excellent resolution is afforded, the deficiency mentioned above is again at the forefront: the optical functioning of an optical surface structure to be inspected cannot be replicated, so that even surface structures having sufficiently high quality may be erroneously rejected.

US 2015/0253256 A1 describes an inspection system. A strong chromatic aberration is employed such that different planes of a substrate are illuminated by different wavelengths, whereby light which is reflected back from the various planes can in turn be evaluated. Here again, the optical functioning of an optical surface structure to be inspected cannot be replicated.

Lastly, U.S. Pat. No. 9,952,393 B2 discloses a light guide structure based on anodized aluminum oxide and a fluoropolymer. Liquids are employed in the light guide in certain embodiments. However, the publication does not disclose how an optical surface structure can be inspected.

The above-mentioned methods and arrangements have in common that they do not replicate the actual optical effect of a part produced with such a surface structure and, consequently, surface structures which would actually be useable are erroneously assessed as defective. Moreover, the sample sizes of scanning electron microscopes and laser scanning microscopes are limited and allow merely localized measurement of microstructures.

SUMMARY OF THE INVENTION

Therefore, it is an object of the invention to describe a method and an arrangement by which a surface structure, particularly that of a tool insert for producing optical structures, can be nondestructively inspected. The inspection should, as far as possible, show only optically relevant defects of the surface structures without erroneously detecting as defective those surface structures in which there occur only defects that are optically non-relevant for the subsequent optical functioning of the parts produced by the tool insert. The method and arrangement, respectively, should also be capable of inspecting fine optical structures in the micrometer and nanometer range. The invention should further be realizable economically by the simplest means possible, and the inspection should only require a comparatively small expenditure of time.

This object is met according to the invention by a method for the nondestructive inspection of a surface structure, comprising the following steps:

The surface structure is first prepared in a step a). In a step b) following the preparation, at least a portion of the surface structure is wetted with a liquid. As a result of this wetting, a liquid layer is formed on, i.e., above, the aforementioned portion of the surface structure. This layer is bounded by the surface structure on its underside and by a gaseous medium—generally air or another gas—on its upper side and accordingly has a layer thickness, referred to hereinafter simply as thickness. A variation in the thickness of the liquid above the aforementioned portion of the surface structure is at most 50% of the maximum thickness of the liquid above the surface structure, so that the liquid forms a light guide with two large surfaces on top and bottom, which light guide has, and is bounded by, the inverse shape of the surface structure on a first large surface and is bounded by air or another gas on a second large surface.

In the next step c), light is coupled into the light guide by employing corresponding means for coupling in light. The means for coupling in light preferably couple the light directly into the liquid, namely, in such a way that at least a portion of the in-coupled light propagates in the light guide formed from the liquid through total internal reflection (light conductor effect) within the light guide until the light impinges at least partially on the inverse shape of the surface structure. Therefore, the means for coupling in light are advisably located in the liquid. The means for coupling in light can be LEDs, for example, which are preferably encapsulated in a watertight manner in a transparent material, or one or more further light guides comprising, for example, a transparent polymer, such as PMMA or polycarbonate, which couple light into the light guide comprising the liquid. Because of the light-conducting effect in the light guide, the in-coupling of light causes the aforementioned inverse shape of the surface structure at the first large surface to be impinged by light, as a result of which at least a portion of the light coupled into the light guide is coupled out of the light guide via the second large surface.

Subsequently, an image of the light coupled out of the second large surface of the light guide is captured in a step d) and evaluated in a step e). The evaluation is carried out in terms of an inspection of at least one predetermined parameter, and the inspection is negative, i.e., leads to a negative finding, if and when the evaluation of the at least one parameter finds that this parameter lies outside of a predetermined parameter range (otherwise, the inspection is positive).

For the aforementioned capture of an image of the light coupled out of the second large surface of the light guide, a color image, a black-and-white image and/or preferably a luminance image (i.e., a luminance distribution over the surface) can be captured, for example, with a suitable camera. The capture of an image involves the recording of a plurality of images with different exposure times in order to generate from this recording an image with a higher dynamic range, namely, an HDR recording. Further, the respective image may be captured merely from one angle, but preferably from as many different angles (sequentially or in parallel) as possible, i.e., in this case, there are a plurality of images available for the subsequent evaluation.

The following parameters can be specified, for example, for the evaluation of the captured image with respect to at least one predetermined parameter: mean brightness, peak brightness, minimum brightness, maximum brightness, homogeneity (minimum value divided by maximum value), rainbow visibility (i.e., quantification of color gradients, such as by also determining the homogeneity of the X and Y color values over the surface area of the image), defect visibility (such as by evaluating gradients over the brightness of the surface area; these should not exceed a determined limiting value), and/or visibility of hotspots (for example, by determining contrast along a fixed line in the image, such as at a distance of a few millimeters from the means for coupling in light). Different parameters and/or further parameters are possible. There is a variety of algorithms known from the art for identifying defects in images.

For each such parameter, there is specified a target quantity or range of target quantities which is identical to the specified parameter range and is to be achieved taking into account a tolerance range.

The aforementioned evaluation is preferably carried out by means of a processor with software. However, a dedicated arrangement having at least corresponding evaluating electronics can also be provided for this purpose.

The inspection is negative if the evaluation of the at least one parameter—or, if a plurality of parameters are used simultaneously, the evaluation of all of the parameters at least for one parameter—shows that it lies outside of the predetermined parameter range. Otherwise, the inspection is positive.

In a first embodiment of the invention, steps b) and c) are implemented as described in the following: First, the surface structure—or a carrier substrate to which the surface structure is applied—is placed in a tub. The tub is then filled with a liquid so that the liquid forms a light guide which is defined by the dimensions of the tub and which has the inverse shape of the surface structure on a first large surface. Finally, light is coupled into the light guide by the means for coupling in light, these means being immersed in the liquid so that the aforementioned inverse shape of the surface structure at the first large surface is impinged by light due to the light-conducting effect in the light guide, as a result of which at least a portion of the light coupled into the light guide is coupled out of the light guide via a second large surface. The tub can comprise metal or plastic such as PMMA or polycarbonate, for example.

In a second embodiment of the invention, by contrast, steps b) and c) are implemented as follows: A cavity is applied to the surface structure and/or to a carrier substrate on which the surface structure is arranged. The cavity seals in a watertight manner with the surface structure and/or the carrier substrate, and the cavity comprises means for coupling light into the cavity and, optionally, is at least partially transparent at least on a narrow side. Subsequently, the cavity is filled with a liquid so that the liquid forms a light guide which is defined by the dimensions of the cavity and which has the inverse shape of the surface structure on a first large surface. Light is then coupled into the light guide, the means for coupling in light being used for this purpose.

Because of the light-conducting effect in the light guide, the aforementioned inverse shape of the surface structure on the first large surface of the cavity is impinged by light such that at least a portion of the light coupled into the cavity is coupled out of the light guide via a second large surface.

The means for coupling in light can be, for example, a light emitting diode or, preferably, an LED array which is watertight. The cavity can comprise, for example, metal or plastic, such as PMMA or polycarbonate. Further, the cavity can be fastened in a watertight matter to the surface structure by means of adhesive tape. In this regard, it is advantageous, although not necessary, for the structured area of the surface structure to be smaller than the surface area of the cavity so that the narrow sides of the cavity rest on the surface structure outside of the structured area. The cavity is preferably open and/or transparent in direction of the light coupled out of the liquid light guide. In most cases of application, the first large surface corresponds to the underside of the light guide and the second large surface corresponds to the upper side of the light guide.

The liquid is preferably transparent to visible light and it preferably comprises deionized or distilled water. In other embodiments, it is provided that the liquid is an alcohol or another liquid that can be removed from the surface structure, or evaporated from the latter, without leaving a residue. For particular cases of application, the liquid can also, or exclusively, be transparent in the wavelength range not visible to the human eye, such as the UV range or IR range, e.g., when testing surface structures having optical effects which lie in such wavelength ranges.

The method according to the invention acquires particular importance when the surface structure to be inspected is formed inverse to the out-coupling structure of the large surface of a light guide (which is to be produced by means of the surface structure). Accordingly, the inverse shape of the surface structure to be inspected is considered to form, in turn, a non-inverse shape of an actual out-coupling structure of a light guide, namely also with any defects that may be present in the surface structure itself and/or on the surface which carries the surface structure and which is considered subject to inspection within the framework of the method. Accordingly, thanks to the invention, the functioning of a light guide (to be produced by means of the surface structure) is replicated without destroying the surface structure. It should be noted that the thickness of the liquid typically deviates from the thickness of the light guide in order to obtain a homogeneously bright light guide which facilitates the identification of defects, since the out-coupling of the light differs qualitatively between the liquid light guide and a solid light guide (comprising, e.g., a polymer) which is producible by means of the surface structure. In the case of the liquid light guide, the light is coupled out exclusively reflectively. In the case of solid light guides, on the other hand, the deflection is carried out by means of refractive index heterogeneities which, in most cases, are less efficient than reflections. Therefore, the liquid light guide is generally thicker than a solid light guide. For example, for a solid light guide having a thickness of 2 mm which couples out light by means of prismatic structures, the optimum height of the liquid film for approximate simulation of the optical functionality based on the surface structure is about 5 mm. If the height of the liquid film is less, the brightness decreases with the distance from the means for coupling light into the liquid. With larger film thicknesses of the liquid, the brightness increases with the distance. The optimum height must be determined in each instance for the corresponding application or surface structure, respectively.

The method according to the invention can also be applied advantageously when the surface structure to be inspected is formed like the out-coupling structure on the large surface of a light guide (to be produced by means of the surface structure) with respect to polarity. In this case, the inverse shape of the surface structure to be inspected is considered to form, in turn, an inverse shape of an actual out-coupling structure of a light guide, namely also with defects, if any, in the surface structure itself and/or on the surface which carries the surface structure and which is considered subject to inspection within the framework of the method. Accordingly, thanks to the invention, the functioning of a light guide (to be produced by means of the surface structure) is replicated without destroying the surface structure. Corresponding parameters must also be determined for this case of application because the light coupled out of the light guide produced by means of the liquid generally has a different distribution than the light guide to be finally produced. In this case, a light guide to be produced would be produced with a negative (reverse polarity, e.g., by means of a copy) of the surface structure to be inspected here.

It should be noted that the method according to the invention can also be applied when the surface structure to be inspected does not correspond to the out-coupling structure of a light guide or to the inverse shape thereof. In this case, at least one parameter, preferably a plurality of parameters, can also be determined for the evaluation as was described above.

The surface structure to be inspected is advantageously fixedly mounted on a tool insert. Such a tool insert, often also referred to as a "shim", comprises in its surface structure, e.g., convex microprisms which are then concave in the light guide formed by the liquid—as well as in a light guide to be produced by means of the tool insert—and serve as defined out-coupling structures for light. In other words, thanks to the light guide formed, according to the invention, by the liquid, a light guide to be produced by means of the tool insert is physically replicated, although usually with a different material and non-statically. This allows the advantageous inspection in terms of whether all of the defects present on the surface structure and imperfections on subsequently produced light guides are actually visible or not.

Such a tool insert can advantageously comprise a metal or a metal alloy, e.g., nickel, nickel-cobalt, nickel-phosphorus, a stainless steel, brass, copper or aluminum. Alternatively, it is possible that the tool insert 6 comprises a glass or a polymer, e.g., an acrylic-based, cured lacquer.

Further, it can be advantageous when the means for coupling light into the light guide comprise an in-coupling structure in addition to an illuminant, such as at least one LED or an LED array. Such in-coupling structures will be familiar to the person skilled in the art and are often used for coupling light from LED arrays into the narrow sides of light guides, in particular in order to homogenize the light distribution in the light guide and/or to reduce or entirely prevent hotspot artifacts. Such in-coupling structures, also known as serrations, comprise, for example, convex and/or concave lenticular structures, prism structures, lens structures or hexagonal structures (or other structures as well).

The use of such an in-coupling structure within the framework of the invention can ensure that the light guide comprising the liquid experiences an in-coupling of light comparable to a light guide to be produced subsequently by means of the surface structure, so that the captured image more closely approximates an image of the optical behavior of a light guide to be produced subsequently.

In a further embodiment, a camera is used for capturing the image in step d), conoscopic imaging optics, for example, in the form of a corresponding objective or microscope setup, being arranged upstream of the camera. Conoscopy is a contrast method for imaging transparent or luminous objects which measures brightness in angular resolution. The system described in the preceding paragraphs is particularly suitable for detecting defects over the surface of a micro-structured surface, for example. However, it is impossible to detect systematic deviations of the structures, e.g., angles or rounded portions of the out-coupling structures, such as in the case of microprisms. However, these defects can be detected by means of an angle-resolved brightness measurement. The angular coordinates and half width of an emission peak, inter alia, offer information about the quality of the microstructures. Therefore, conoscopy is particularly well-suited for detecting possible defects or deviations of parameters. Alternatively, the angle-resolved brightness can be determined by a goniometer to which a light sensor is fastened.

The object of the invention is met by an arrangement for the nondestructive inspection of a surface structure. Such an arrangement comprises a cavity for receiving a liquid. The liquid wets at least a portion of the surface structure to be inspected and forms above this portion of the surface structure a layer having a thickness. The thickness of the liquid above this portion of the surface structure varies by at most 50% of the maximum thickness of the liquid above the surface structure so that the liquid forms a light guide with two large surfaces on the top and on the bottom, this light guide having and being bounded by an inverse shape of the surface structure at a first large surface and bounded by air or another gas at a second large surface. The arrangement further comprises means for coupling light into the light guide so that the aforementioned inverse shape of the surface structure at the first large surface is impinged by light due to the light-conducting effect in the light guide, as a result of which at least a portion of the light coupled into the light guide is coupled out of the light guide via the second large surface. Finally, the arrangement comprises a camera for capturing an image of the light coupled out of the second large surface of the light guide and a computing unit connected to the camera and having software which evaluates the captured image with respect to the inspection of at least one predetermined parameter, and the inspection is negative if and when the evaluation of the at least one parameter indicates that this parameter lies outside of a predetermined parameter range. Otherwise, the inspection is positive.

In a first embodiment of the arrangement according to the invention, the cavity comprises at least one frame which is applied to the surface structure and/or a carrier substrate on which the surface structure is arranged. The cavity seals in a watertight manner with the surface structure and/or the carrier substrate thereof. Further, the cavity is at least partially transparent on at least one narrow side ("open" also means transparent in this case) and comprises means for coupling light into the cavity.

In contrast, in a second embodiment, the cavity has the shape of a tub in which the surface structure to be inspected is inserted, the cavity being filled at least partially with the liquid.

In both embodiments, conoscopic imaging optics can be arranged upstream of the camera.

The details already described above apply in an analogous sense to the arrangement according to the invention and will not be repeated so as to avoid redundancy.

The performance of the invention remains consistent in principle when the above-described parameters are varied within certain limits.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following with reference to drawings which also disclose key features of the invention. These embodiment examples are provided merely to be illustrative and should not be considered as restrictive. For example, a description of an embodiment example having a plurality of elements or components should not be interpreted to mean that all of these elements or components are necessary for its implementation. On the contrary, other embodiment examples may also contain alternative elements and components, fewer elements or components, or additional elements or components. Elements or components of different embodiment examples can be combined with one another unless otherwise stated. Modifications and alterations which are described for one of the embodiment examples may also be applicable to other embodiment examples. Like or comparable elements in the various figures are designated by the same reference numerals and not mentioned repeatedly so as to prevent repetition. The drawings show.

DETAILED DESCRIPTION OF THE DRAWINGS

The drawings are not to scale and are merely schematic depictions. Furthermore, only a few selected elements and light rays are depicted in all of the drawings, although there are many such light rays and/or elements of a surface structure in the physical embodiment.

Figure 1:
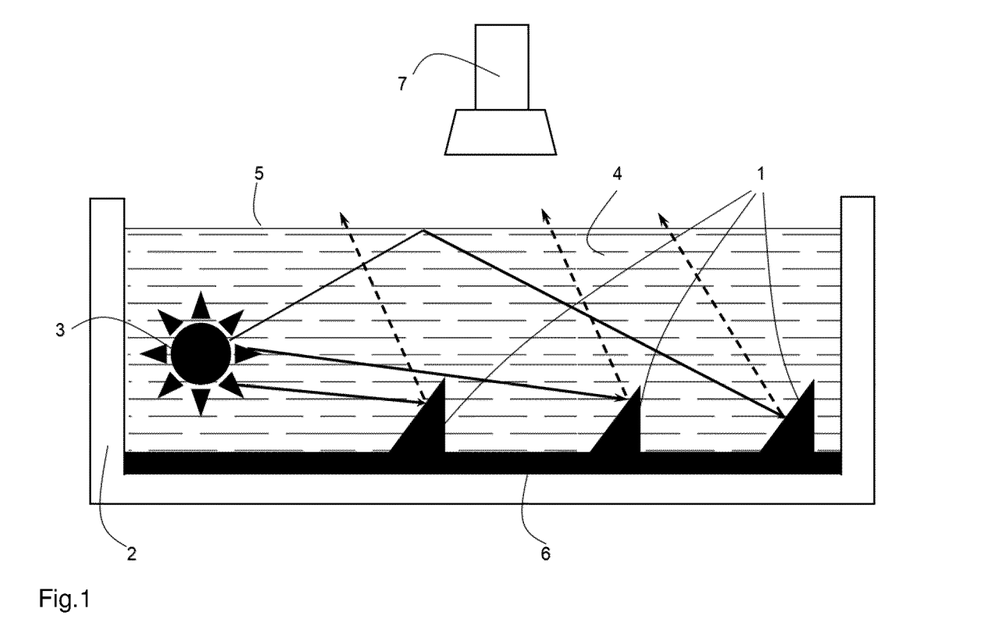
FIG. 1 a schematic diagram showing the implementation of a method for inspecting a surface structure in a first embodiment.

FIG. 1 shows the schematic diagram of the implementation of a method for inspecting a surface structure in a first embodiment. The corresponding method for the nondestructive inspection of a surface structure 1 comprises the steps described in the following.

The surface structure is first prepared in a first step a). In a step b) following step a), at least a portion of the surface structure 1 is wetted with a liquid 4. As a result of this wetting, a liquid layer is formed on, i.e., above, the aforementioned portion of the surface structure 1. This layer (comprising liquid 4) is bounded by the surface structure 1 on its underside and by a gaseous medium—generally air or another gas—on its upper side and accordingly has a layer thickness, referred to hereinafter simply as thickness. A variation in the thickness of the liquid 4 above the aforementioned portion of the surface structure 1 is at most 50% of the maximum thickness of the liquid 4 above the surface structure 1, so that the liquid 4 forms a light guide 5 with two large surfaces on top and bottom, which light guide 5 has, and is bounded by, the inverse shape of the surface structure 1 on a first large surface and is bounded by air or another gas on a second large surface. It is also contemplated for particular configurations that the liquid 4 is not bounded by air or another gas at its second large surface but rather by a transparent material, for example, glass or a polymer, such as PMMA, PMMI or polycarbonate.

In the next step c), light is coupled into the light guide 5 by employing corresponding means 3 for coupling in light, for example, illuminants, such as an LED or an LED array, in a watertight manner in each instance, which can be ensured, for example, by a transparent enclosure by means of polymer materials. Because of the light-conducting effect in the light guide 5—represented in FIG. 1 by the arrows with solid lines—the above-mentioned inverse shape of the surface structure 1 is impinged by light at the first large surface, as a result of which at least a portion of the light coupled into the light guide 5 is coupled out of the light guide 5 via the second large surface, which is represented by the arrows with dashed lines.

Subsequently, an image of the light coupled out of the second large surface of the light guide 5 is captured in a step d) and evaluated in a step e). The evaluation is carried out in terms of an inspection of at least one predetermined parameter, and the inspection is negative, i.e., leads to a negative finding, if and when the evaluation of the at least one parameter finds that this parameter lies outside of a predetermined parameter range (otherwise, the inspection is positive).

A surface structure 1 to be inspected can comprise, for example, a plurality of identical or at least partially different microlenses, microprisms, grating structures, scattering structures and/or other three-dimensional microstructures on the scale of micrometers or submicrometers.

The thickness or layer thickness of the liquid 4, for example, can amount to some 50 micrometers up a few millimeters, but is preferably between 0.3 mm and 3 mm, 5 mm or 10 mm.

In the first embodiment of the invention according to FIG. 1, steps b) and c) are implemented as described in the following: the surface structure 1 is placed in a tub 2. The tub 2 is filled with a liquid 4 so that the liquid forms a light guide 5 which is defined by the dimensions of the tub 2 and which has the inverse shape of the surface structure 1 at a first large surface. The tub 2 can be filled before or after the surface structure 1 is placed therein. Finally, light is coupled into the light guide 5 by the means 3 for coupling in light, these means being immersed in the liquid 4 so that the aforementioned inverse shape of the surface structure 1 at the first large surface is impinged by light due to the light-conducting effect in the light guide 5, as a result of which at least a portion of the light coupled into the light guide 5 is coupled out of the light guide 5 via a second large surface. The tub 2 can comprise metal or plastic such as PMMA or polycarbonate, for example.

FIG. 1 shows the implementation of the method at least according to steps a) to c). In the embodiment shown in FIG. 1, the means 3 for coupling in light are located in the liquid 4 and couple the light directly into the latter. Alternatively, an arrangement at the narrow sides of the tub 2—within the boundaries of the right and left sides referring to FIG. 1—is also possible provided these narrow sides are transparent.

For the aforementioned capture of an image of the light coupled out of the second large surface of the light guide 5 formed by the liquid 4, a color image, a black-and-white image and/or preferably a luminance image (i.e., a luminance distribution over the surface) can be captured, for example, with a suitable camera 7. Further, the respective image may be captured merely from one angle, but preferably from as many different angles (sequentially or in parallel) as possible, i.e., in this case, there are a plurality of images available for the subsequent evaluation.

The following parameters are contemplated, for example, for the evaluation of the captured image with respect to the inspection of at least one parameter: mean brightness, peak brightness, minimum brightness, maximum brightness, homogeneity (minimum value divided by maximum value), rainbow visibility (i.e., quantification of color gradients, such as by also determining the homogeneity of the X and Y color values over the surface area of the image), defect visibility (such as by evaluating gradients over the brightness of the surface area; these should not exceed a determined limiting value), and/or visibility of hotspots (for example, by determining contrast along a fixed line in the image, such as at a distance of a few millimeters from the means 3 for coupling in light). Different parameters and/or further parameters are possible. For each such parameter, there is specified a target quantity with corresponding tolerances or a range of target quantities, also referred to as parameter range, to be reached.

The above-mentioned evaluation is preferably carried out by means of a processor with software. However, a dedicated arrangement having at least corresponding evaluating electronics can also be provided for this purpose.

The inspection is negative if the evaluation of the at least one parameter—or, if a plurality of parameters are used simultaneously, the evaluation of all of the parameters at least for one parameter—shows that it lies outside of a predetermined parameter range. Otherwise, the inspection is positive.

Figure 2:
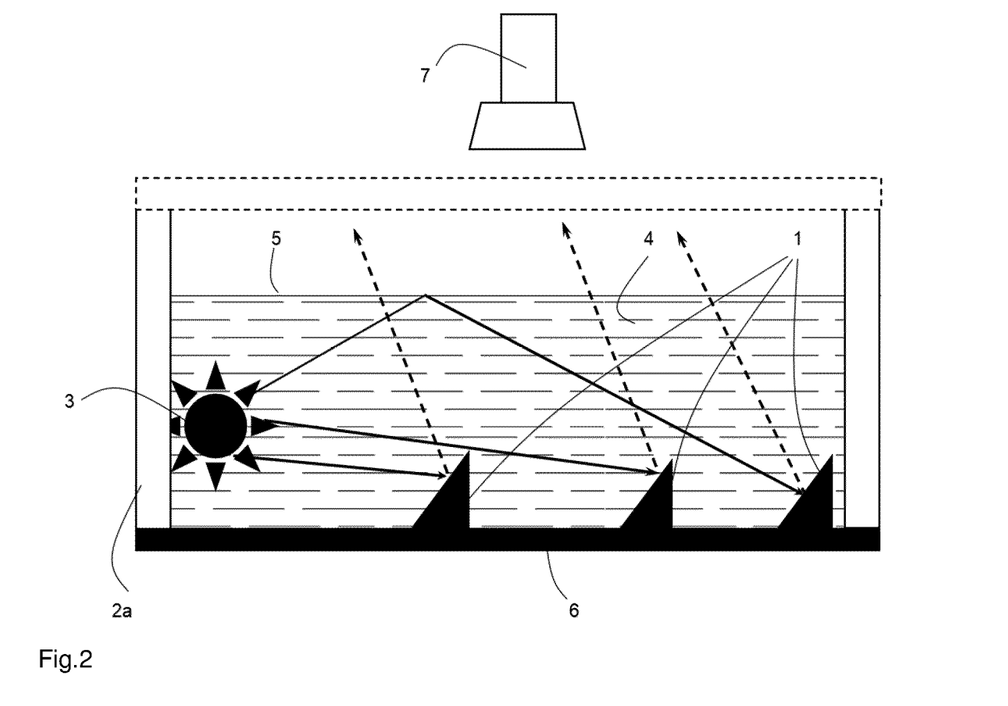
FIG. 2 a schematic diagram showing the implementation of a method for inspecting a surface structure in a second embodiment.

FIG. 2 shows the schematic diagram for the implementation of a method for inspecting a surface structure in a second embodiment. Steps b) and c) are implemented as described in the following: a cavity 2a is applied to the surface structure 1 and/or to a carrier substrate 6 on which the surface structure 1 is arranged. The cavity 2a seals in a watertight manner with the surface structure 1 and/or the carrier substrate 6, and the cavity 2a comprises means 3 for coupling light into the cavity 2a (however, the means 3 can also be provided in the cavity 2a separate from the same) and, optionally, is at least partially transparent at least on a narrow side—the boundaries shown on the left-hand side and right-hand side in FIG. 2. Subsequently, the cavity 2a is filled with a liquid 4 so that the liquid 4 forms a light guide 5 which is defined by the dimensions of the cavity 2a and which has the inverse shape of the surface structure 1 at a first large surface. Subsequently, light is coupled into the light guide 5 by means 3 and, because of the light-conducting effect in the light guide 5, the aforementioned inverse shape of the surface structure 1 at or in proximity to the first large surface of the cavity 2a is impinged by light such that at least a portion of the light coupled into the cavity 2a is coupled out of the light guide 5 5 via a second large surface.

The means 3 for coupling in light can be, for example, an LED array which is watertight. The cavity 2a can comprise, for example, metal or plastic, such as PMMA or polycarbonate. Further, the cavity 2a can be fastened in a watertight matter to the surface structure by means of adhesive tape. In this regard, it is advantageous, although not necessary, for the structured area of the surface structure 1 to be smaller than the surface area of the cavity 2a so that the narrow sides of the cavity 2a rest on the surface structure 1 outside of the structured area. The cavity 2a is preferably open and/or transparent in direction of the light coupled out of the light guide 5 comprising liquid 4 (indicated in FIG. 2 by the rectangle in dashes above the cavity 2a).

In the cases of application presented herein, the first large surface corresponds to the underside of the light guide 5 and the second large surface corresponds to the upper side of the light guide 5. The liquid 4 is preferably transparent to visible light and preferably comprises deionized or distilled water. Other embodiments, alcohol-based, for example, are possible.

The method described above acquires particular importance when the surface structure 1 to be inspected is formed inverse to the out-coupling structure of the large surface of a light guide (which is to be produced by means of the surface structure 1).

Accordingly, the inverse shape of the surface structure 1 to be inspected is considered to form, in turn, a non-inverse shape of an actual out-coupling structure of a light guide, namely also with any defects that may be present in the surface structure itself and/or on the surface which carries the surface structure and which is considered subject to inspection within the framework of the method. Accordingly, thanks to the invention, the functioning of a light guide (to be produced by means of the surface structure 1) is replicated without destroying the surface structure 1. It should be noted that the thickness of the liquid 4 preferably deviates by no more than 40% to 60% from the thickness of the light guide for which the surface structure 1 to be inspected was produced.

The surface structure 1 to be inspected is advantageously fixedly applied to a carrier substrate 6 or tool insert 6. Such a tool insert 6, often also referred to as a "shim", comprises in its surface structure 1, e.g., convex microprisms which are then concave in the light guide 5 formed by the liquid 4—as well as in a light guide to be produced by means of the tool insert 6—and serve as defined out-coupling structures for light. In other words, thanks to the light guide 5 formed, according to the invention, by the liquid 4, a light guide to be produced by means of the tool insert 6 is physically replicated, although usually with a different material and non-statically. This makes it possible to check advantageously whether all of the defects present on the surface structure and imperfections on subsequently produced light guides are actually visible or not.

Figure 3:
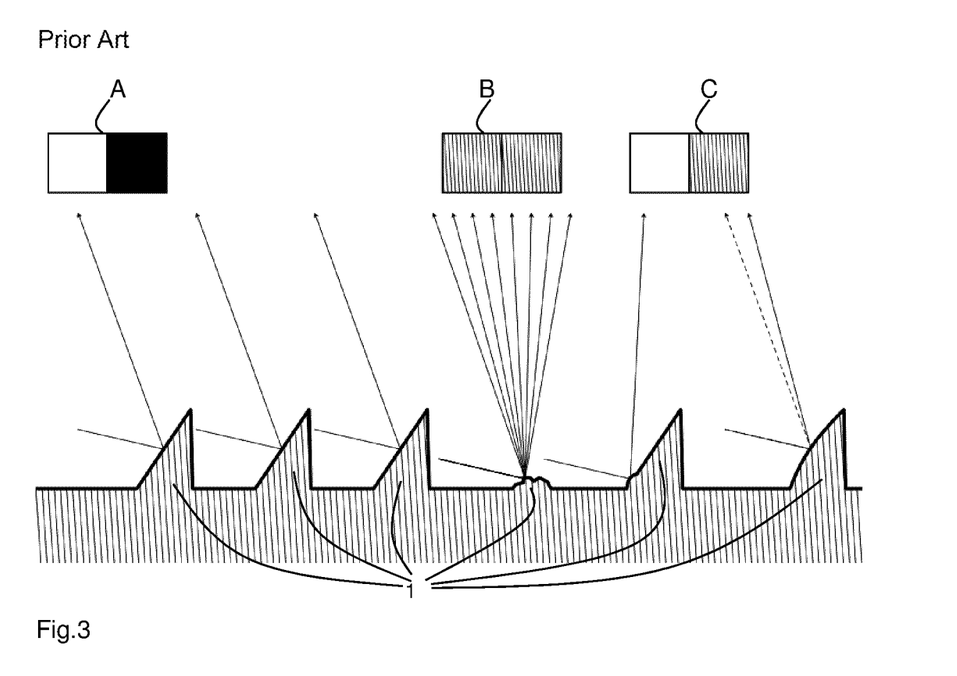
FIG. 3 a schematic diagram showing a possible defective inspection variant of a surface structure in the prior art.
Figure 4:
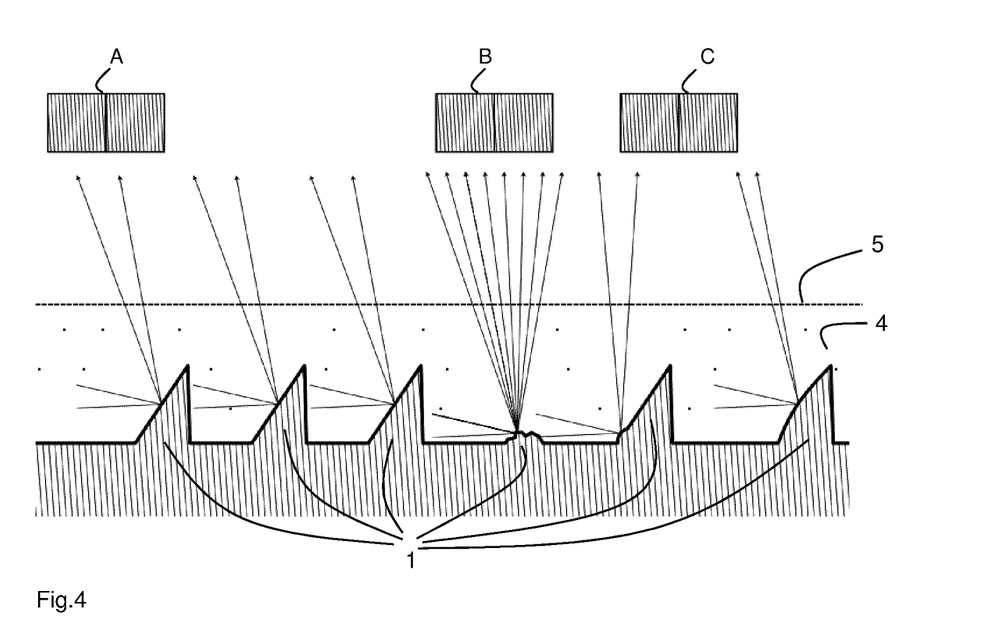
FIG. 4 a schematic diagram showing a possible inspection variant of a surface structure within the framework of the present method.

This advantage will be described in more detail in the following by means of the drawings in FIG. 3 and FIG. 4. FIG. 3 is a schematic diagram showing a possible defective inspection variant of a surface structure in the prior art, and FIG. 4 is a schematic diagram showing a possible inspection variant of a surface structure within the framework of the present method.

In a prior-art method according to FIG. 3 which is carried out purely through optical illumination and visual inspection, the one surface structure 1 is irradiated, for example, with substantially parallel white light, indicated here by the rays incident upon the elements of the surface structure 1 (in this case, microprisms) from upper left. The emergent rays from the elements of the surface structure 1 are detected through a visual inspection with a camera or by an observer and evaluated. The double boxes A, B and C illustrate what is to be seen from selectable viewing angles. For example, the box on the left-hand side of a respective double box A, B, C would be representative of a view from −10° from the perpendicular bisector and the box on the right-hand side of a double box would represent a view from +10° from the perpendicular bisector (angles measured in the horizontal). What this shows is that the obviously correct three elements on the left-hand side in the surface structure 1 generate a high contrast between −10° and +10° (high brightness after −10°, low brightness after +10°), while the fourth element of the surface structure 1 generates a medium brightness in both directions. Lastly, in this prior-art inspection variant, the two elements on the right-hand side of the surface structure 1 generate a high brightness in the −10° direction and a medium brightness in the +10° direction in this example. Based on these results, the surface structure 1 could be declared defective because there are too many brightness fluctuations.

However, it is often the case that many types of defects in a surface structure 1, particularly in tool inserts 6 for light guides to be produced, cause only minor anomalies, if any. Accordingly, in the example of FIG. 3 the surface structure 1 would possibly be erroneously declared unusable. This is where the advantages of the invention come into play as will be explained referring to the schematic diagram in FIG. 4 which shows a possible inspection variant of a surface structure 1 within the framework of the present method.

Owing to the illumination with light from means 3 by means of total internal reflection in the light guide 5 formed from the liquid 4, there is a larger angular spectrum (compared with far field illumination with parallel light according to FIG. 3) for illuminating the surface structure 1. Strictly speaking, it is not primarily the illumination of the surface structure 1 that plays the leading role here. On the contrary, by means of the inverse structure of the surface structure 1 at the underside of the light guide 5 comprising the liquid 4, light out-coupling effects are utilized in order to couple out light via the upper surface of the light guide 5 for recording and evaluation. Total internal reflection in particular also plays a role again depending on angular conditions.

It will be appreciated from consideration of the double boxes A, B and C in FIG. 4 that all of the elements in the surface structure 1 clearly produce a medium brightness in both directions (−10° and +10°) in spite of the damage or deformation in the three exemplary elements on the right-hand side of the surface structure 1. Due to the fact that, in the present invention, e.g., the light-conducting effect of a light guide which is to be produced later by the surface structure 1 is replicated by means of the light guide 5 formed of liquid 4, then, when at least one parameter is sufficiently met for evaluating an image of the light coupled out of the light guide 5, this existing exemplary surface structure 1 can be declared acceptable, i.e., the inspection is positive, even when elements of the surface structure 1 are not perfect.

As can be gathered from the preceding description, the homogeneities of the luminance images captured from −10° and +10° horizontally from the perpendicular bisector (e.g., per area scan) could serve as parameters in a test such as this. These homogeneities of the two luminance images are defined, respectively, as a minimum value of the luminance divided by the maximum value of the luminance in the luminance image. If these two homogeneities for the two luminance images captured from the two directions are, e.g., less than 50%, the inspection of the surface structure is negative. Otherwise, it will be positive.

Further, for example, (relative) gradients for luminance variations within the luminance images which, again, are captured from −10° and +10° horizontally from the perpendicular bisector, particularly per area scan, could serve as alternative or additional parameters in such a test. These (relative) gradients of the two luminance images could accordingly be defined, e.g., the greatest percent changes in the luminance within a radius of, for example, 3 (or 5 for 10 or another selectable quantity of) pixels. Then the largest (relative) gradient is determined in percent for each luminance image. If these two (relative) gradients for the two luminance images captured from both directions are greater than 25%, for example, the inspection of the surface structure is negative. Otherwise, it is positive. A boundary value larger or smaller than the boundary value of 25% mentioned above can also be selected depending on the case of application. Other definitions may be contemplated for parameters and lie within the scope of the invention.

A tool insert 6 can advantageously comprise a metal or a metal alloy, e.g., nickel, nickel-cobalt, nickel-phosphorus, a stainless steel, brass, copper or aluminum.

FIG. 1 and FIG. 2 may also be referred to for describing an arrangement for the nondestructive inspection of a surface structure 1 by which, in particular, the method described in the preceding can be implemented. This arrangement comprises either a tub 2 (see FIG. 1) or a cavity 2a (see FIG. 2) for receiving a liquid 4. The liquid 4 wets at least a portion of the surface structure 1 to be inspected and forms above this portion of the surface structure 1 a layer having a thickness. The thickness of the liquid 4 above this portion of the surface structure 1 varies by at most 50% of the maximum thickness of the liquid 4 above the surface structure 1 so that the liquid 4 forms a light guide 5 with two large surfaces on the top and on the bottom, this light guide 5 having and being bounded by an inverse shape of the surface structure 1 at a first large surface and bounded by air or another gas at a second large surface. The arrangement further comprises means 3 for coupling light into the light guide 5 so that the aforementioned inverse shape of the surface structure 1 at the first large surface is impinged by light due to the light-conducting effect in the light guide 5, as a result of which at least a portion of the light coupled into the light guide 5 is coupled out of the light guide 5 via the second large surface. Finally, the arrangement comprises a camera 7 for capturing an image of the light coupled out of the second large surface of the light guide 5 and a computing unit, not shown, which is connected to the camera 7 and has software which evaluates the captured image with respect to the inspection of at least one predetermined parameter, and the inspection is negative if and when the evaluation of the at least one parameter indicates that this parameter lies outside of a predetermined parameter range. Otherwise, the inspection is positive.

In a first embodiment according to FIG. 1, a tub 2 is used, the surface structure 1 to be inspected is placed in the tub 2, and the tub 2 is at least partially filled with the liquid 4.

In contrast, in a second embodiment of the arrangement according to the invention shown in FIG. 2, the cavity 2a comprises at least one frame which is applied to the surface structure 1 and/or a carrier substrate 6 on which the surface structure 1 is arranged. The cavity 2a seals in a watertight manner with the surface structure 1 and/or the carrier substrate 6 thereof. The cavity 2a comprises means 3 for coupling light into the cavity 2a, particularly into the light guide 5 formed from the liquid 4. However, these means 3 must not yet be fixedly connected to the cavity 2a.

All of the statements pertaining to the above-described method apply in an analogous sense to the above-described arrangement and will therefore not be repeated so as to avoid redundancy.

The above-described invention meets its stated object, namely, to describe a method and an arrangement by which a surface structure, particularly that of a tool insert for optical structures, can be nondestructively inspected. The inspection shows only optically relevant defects of the surface structures without erroneously evaluating as defective those surface structures in which there occur only defects that are not optically relevant for the subsequent optical functioning of the parts produced by the tool insert. The method and arrangement, respectively, are capable of inspecting fine optical structures in the micrometer and nanometer range. The invention is further realizable economically by the simplest means and only requires a comparatively small expenditure of time.

The invention described above can advantageously be used wherever sensitive optical surface structures and other surface structures are to be nondestructively inspected and particularly—but not exclusively—for the inspection of the surface structure of tool inserts for producing light guides.

REFERENCE CHARACTERS 1 surface structure
2 tub
2a cavity
3 means
4 liquid
5 light guide
6 carrier substrate/tool insert
7 camera

The invention claimed is:

1. A method for a nondestructive inspection of a surface structure, comprising the following steps:
   a) preparing the surface structure (1) to be inspected,
   b) wetting at least-a portion of the surface structure with a liquid which forms above the portion of the surface structure a layer having a thickness, wherein a variation in the thickness of the liquid above the portion of the surface structure is at most 50% of a maximum thickness of the liquid above the surface structure, so that the liquid forms a light guide with two large surfaces, which light guide has, and is bounded by, an inverse shape of the surface structure on a first large surface and is bounded by air or another gas at a second large surface,
   c) coupling light into the light guide through means for coupling in light so that, as a result of the light-conducting effect in the light guide, the inverse shape of the surface structure at the first large surface is impinged by light, as a result of which at least a portion of the light coupled into the light guide is coupled out of the light guide via the second large surface,
   d) capturing an image of the light coupled out of the second large surface of the light guide,
   e) evaluating the captured image in terms of an inspection of at least one predetermined parameter, wherein the inspection is negative when the evaluation of the at least one parameter finds that the parameter lies outside of a predetermined parameter range.

2. The method for the nondestructive inspection of a surface structure according to claim 1, wherein steps b) and c) are implemented in that:
   a cavity is applied to the surface structure and/or to a carrier substrate on which the surface structure is arranged, wherein the cavity seals in a watertight manner with the surface structure and/or the carrier substrate, and wherein the cavity comprises the means for coupling in light into the cavity and, optionally, is at least partially transparent at least on a narrow side,
   the cavity is filled with the liquid so that the liquid forms the light guide which is defined by the dimensions of the cavity and which has the inverse shape of the surface structure on the first large surface,
   light is coupled into the light guide by the means for coupling in light so that, owing to the light-conducting effect in the light guide, the inverse shape of the surface structure on the first large surface of the cavity is impinged by light such that at least a portion of the light coupled into the cavity is coupled out of the light guide via a second large surface.

3. The method for the nondestructive inspection of a surface structure according to claim 1, wherein steps b) and c) are implemented in that:
   the surface structure is placed in a tub,
   the tub is filled with the liquid so that the liquid forms a light guide which is defined by dimensions of the tub and which has the inverse shape of the surface structure on the first large surface,
   light is coupled into the light guide by the means for coupling in light by immersing these means for coupling in light in the liquid so that the inverse shape of the surface structure at the first large surface is impinged by light due to a light-conducting effect in the light guide, as a result of which at least a portion of the light coupled into the light guide is coupled out of the light guide via a second large surface.

4. The method according to claim 1, wherein the liquid is transparent to visible light and comprises deionized or distilled water.

5. The method according to claim 1, wherein the surface structure to be inspected is formed inverse to an out-coupling structure of the large surface of a light guide or is formed like the out-coupling structure on the large surface of a light guide.

6. The method according to claim 1, wherein the surface structure to be inspected is fixedly mounted on a tool insert.

7. The method according to claim 1, wherein the means for coupling in light into the light guide comprise an in-coupling structure.

8. The method according to claim 1, wherein a camera with conoscopic imaging optics arranged upstream is used to capture the image in step d).

9. An arrangement for the nondestructive inspection of a surface structure, comprising:
   a) a cavity or a tub for receiving a liquid, wherein the liquid wets at least a portion of the surface structure to be inspected and forms above this portion of the surface structure a layer having a thickness, wherein a variation in the thickness of the liquid above this portion of the surface structure is at most 50% of the maximum thickness of the liquid above the surface structure so that the liquid forms a light guide with two large surfaces, the light guide having and being bounded by an inverse shape of the surface structure at a first large surface and bounded by air or another gas at a second large surface,
   b) means for coupling light into the light guide so that the inverse shape of the surface structure at the first large surface is impinged by light due to the light-conducting effect in the light guide, as a result of which at least a portion of the light coupled into the light guide is coupled out of the light guide via the second large surface,
   c) a camera for capturing an image of the light coupled out of the second large surface of the light guide,
   d) a computing unit connected to the camera and having software which evaluates the captured image with respect to at least one parameter, wherein the inspection is negative when the evaluation of the at least one parameter shows that this parameter lies outside of a predetermined parameter range.

10. The arrangement according to claim 9, having a cavity, wherein the cavity comprises at least one frame which is applied to the surface structure and/or a carrier substrate on which the surface structure is arranged, wherein the cavity seals in a watertight manner with the surface structure and/or the carrier substrate thereof, wherein the cavity is further at least partially transparent on at least one narrow side and comprises the means for coupling in light into the cavity.

11. The arrangement according to claim 9, with a tub, wherein the surface structure to be inspected is placed in the tub, wherein the tub is at least partially filled with the liquid.

12. The arrangement according to claim 9, wherein conoscopic imaging optics are arranged upstream of the camera.

13. The arrangement according to claim 9, wherein the optical axis of the camera can be inclined relative to and/or rotatable around a surface normal of a large surface.

* * * * *